(12) United States Patent
Dudar (10) Patent No.: US 12,528,538 B2
(45) Date of Patent: Jan. 20, 2026

(54) SYSTEM AND METHODS FOR OPERATING A PARKED VEHICLE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 678 days.

(21) Appl. No.: 18/070,774

(22) Filed: Nov. 29, 2022

(65) Prior Publication Data

US 2024/0174288 A1   May 30, 2024

(51) Int. Cl.
*B62D 7/15* (2006.01)
*B62D 15/02* (2006.01)

(52) U.S. Cl.
CPC ......... *B62D 7/1509* (2013.01); *B62D 15/027* (2013.01)

(58) Field of Classification Search
CPC .................................................. B62D 7/1509
See application file for complete search history.

(56) References Cited

U.S. PATENT DOCUMENTS

| | | | |
|---|---|---|---|
| 7,378,988 B2 * | 5/2008 | Nordbruch | B62D 15/027 |
| | | | 340/440 |
| 8,849,518 B2 | 9/2014 | Nefcy et al. | |
| 9,114,834 B2 * | 8/2015 | Hauber | B62D 15/027 |
| 9,254,866 B2 * | 2/2016 | Dawson | B60K 17/30 |
| 10,046,804 B2 | 8/2018 | Fendt | |
| 10,293,850 B2 | 5/2019 | Baehrle-Miller | |
| 2021/0001836 A1 * | 1/2021 | Witte | B60W 30/18118 |
| 2022/0097704 A1 | 3/2022 | Collins | |

FOREIGN PATENT DOCUMENTS

JP       2007237838 A  *  9/2007

* cited by examiner

*Primary Examiner* — Valentin Neacsu
*Assistant Examiner* — Hosam Shabara
(74) *Attorney, Agent, or Firm* — Frank Lollo; Price Heneveld LLP (57) ABSTRACT

A system for a vehicle includes a front wheel, a rear wheel, a steering system, a sensing system, and a controller. The front wheel and the rear wheel are arranged on a first side of the vehicle. The steering system controls a directionality of the front wheel and a directionality of the rear wheel. The sensing system senses an exterior environment adjacent to the first side of the vehicle. The sensing system also senses a pitch of the vehicle. The controller controls the directionality of at least one wheel chosen from the front wheel and the rear wheel based on the sensed exterior environment, the sensed pitch of the vehicle, and the vehicle being in a parked condition.

18 Claims, 7 Drawing Sheets

SYSTEM AND METHODS FOR OPERATING A PARKED VEHICLE

FIELD OF THE DISCLOSURE

The present disclosure generally relates to vehicles. More specifically, the present disclosure relates to parked vehicles.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a system for a vehicle includes a front wheel, a rear wheel, a steering system, a sensing system, and a controller. The front wheel and the rear wheel are arranged on a first side of the vehicle. The steering system controls a directionality of the front wheel and a directionality of the rear wheel. The sensing system senses an exterior environment adjacent to the first side of the vehicle. The sensing system also senses a pitch of the vehicle. The controller controls the directionality of at least one wheel chosen from the front wheel and the rear wheel based on the sensed exterior environment, the sensed pitch of the vehicle, and the vehicle being in a parked condition.

Embodiments of the first aspect of the disclosure can include any one or a combination of the following features:

- the controller is configured to position a rearward portion of the at least one wheel chosen from the front wheel and the rear wheel further from a centerline of the vehicle than a forward portion of the at least one wheel chosen from the front wheel and the rear wheel in response to the sensed pitch of the vehicle indicating that a rear of the vehicle is positioned downhill of a front of the vehicle;
- the front wheel and the rear wheel are each adjusted in their directionality by the controller such that the directionality of the front wheel and the directionality of the rear wheel are aligned;
- the controller is configured to position a forward portion of the at least one wheel chosen from the front wheel and the rear wheel further from a centerline of the vehicle than a rearward portion of the at least one wheel chosen from the front wheel and the rear wheel in response to the sensed pitch of the vehicle indicating that a front of the vehicle is positioned downhill of a rear of the vehicle;
- in response to the sensed exterior environment including a road edge fixture adjacent to one of the front wheel and the rear wheel and that the road edge fixture is absent from an area adjacent to the other of the front wheel and the rear wheel, the controller is configured to adjust the directionality of the one of the front wheel and the rear wheel that is adjacent to the road edge fixture based on the sensed pitch of the vehicle;
- in response to the sensed pitch of the vehicle indicating that a front of the vehicle is positioned downhill of a rear of the vehicle, the controller is configured to position a forward portion of the one of the front wheel and the rear wheel that is adjacent to the road edge fixture further from a centerline of the vehicle than a rearward portion of the one of the front wheel and the rear wheel that is adjacent to the road edge fixture;
- in response to the sensed pitch of the vehicle indicating that a rear of the vehicle is positioned downhill of a front of the vehicle, the controller is configured to position a rearward portion of the one of the front wheel and the rear wheel that is adjacent to the road edge fixture further from a centerline of the vehicle than a forward portion of the one of the front wheel and the rear wheel that is adjacent to the road edge fixture;
- the road edge fixture is a curb;
- the controller is configured to adjust the directionality of the front wheel and the rear wheel such that a forward portion of the front wheel and a forward portion of the rear wheel are each further from a centerline of the vehicle than a rearward portion of the front wheel and a rearward portion of the rear wheel, respectively, in response to the sensed exterior environment lacking a road edge fixture adjacent to the front wheel and the rear wheel and the sensed pitch of the vehicle indicating that a front of the vehicle is positioned downhill of a rear of the vehicle;
- the controller is configured to adjust the directionality of the front wheel and the rear wheel such that a rearward portion of the front wheel and a rearward portion of the rear wheel are each further from a centerline of the vehicle than a forward portion of the front wheel and a forward portion of the rear wheel, respectively, in response to the sensed exterior environment lacking a road edge fixture adjacent to the front wheel and the rear wheel and the sensed pitch of the vehicle indicating that a rear of the vehicle is positioned downhill of a front of the vehicle;
- in response to the sensed exterior environment lacking a road edge fixture adjacent to the front wheel and the rear wheel and the sensed pitch of the vehicle indicating that a rear of the vehicle is positioned downhill of a front of the vehicle, the controller is configured to (1) adjust the directionality of the front wheel such that a forward portion of the front wheel is further from a centerline of the vehicle than a rearward portion of the front wheel; and (2) adjust the directionality of the rear wheel such that a rearward portion of the rear wheel is further from the centerline of the vehicle than a forward portion of the rear wheel;
- the sensing system includes an imager that senses the exterior environment adjacent to the first side of the vehicle; and
- the sensing system includes a pitch sensor that senses the pitch of the vehicle.

According to a second aspect of the present disclosure, a method of operating a parked vehicle includes sensing an exterior environment adjacent to a first side of the vehicle. The method of operating a parked vehicle also includes sensing a pitch of the vehicle. The method of operating a parked vehicle further includes determining a desired directionality of a front wheel and a desired directionality of a rear wheel of the vehicle. The front wheel and the rear wheel are each positioned along the first side. The desired directionality of the front wheel and the desired directionality of the rear wheel is based on the sensed exterior environment adjacent to the first side of the vehicle and the sensed pitch of the vehicle.

Embodiments of the second aspect of the present disclosure can include any one or a combination of the following features:
  adjusting at least one wheel chosen from the front wheel and the rear wheel to the desired directionality;
  the desired directionality of the at least one wheel chosen from the front wheel and the rear wheel places a forward portion of the at least one wheel chosen from the front wheel and the rear wheel further from a centerline of the vehicle than a rearward portion of the at least one wheel chosen from the front wheel and the rear wheel when the sensed pitch of the vehicle indicates that a front of the vehicle is downhill of a rear of the vehicle;
  the desired directionality of the at least one wheel chosen from the front wheel and the rear wheel places a rearward portion of the at least one wheel chosen from the front wheel and the rear wheel further from a centerline of the vehicle than a forward portion of the at least one wheel chosen from the front wheel and the rear wheel when the sensed pitch of the vehicle indicates that a rear of the vehicle is downhill of a front of the vehicle;
  the sensing of the exterior environment adjacent to the first side of the vehicle includes identifying a road edge fixture adjacent to one of the front wheel and the rear wheel and that the road edge fixture is absent from an area adjacent to the other of the front wheel and the rear wheel; and
  adjusting the one of the front wheel and the rear wheel that is adjacent to the road edge fixture such that the desired directionality is attained.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 3:
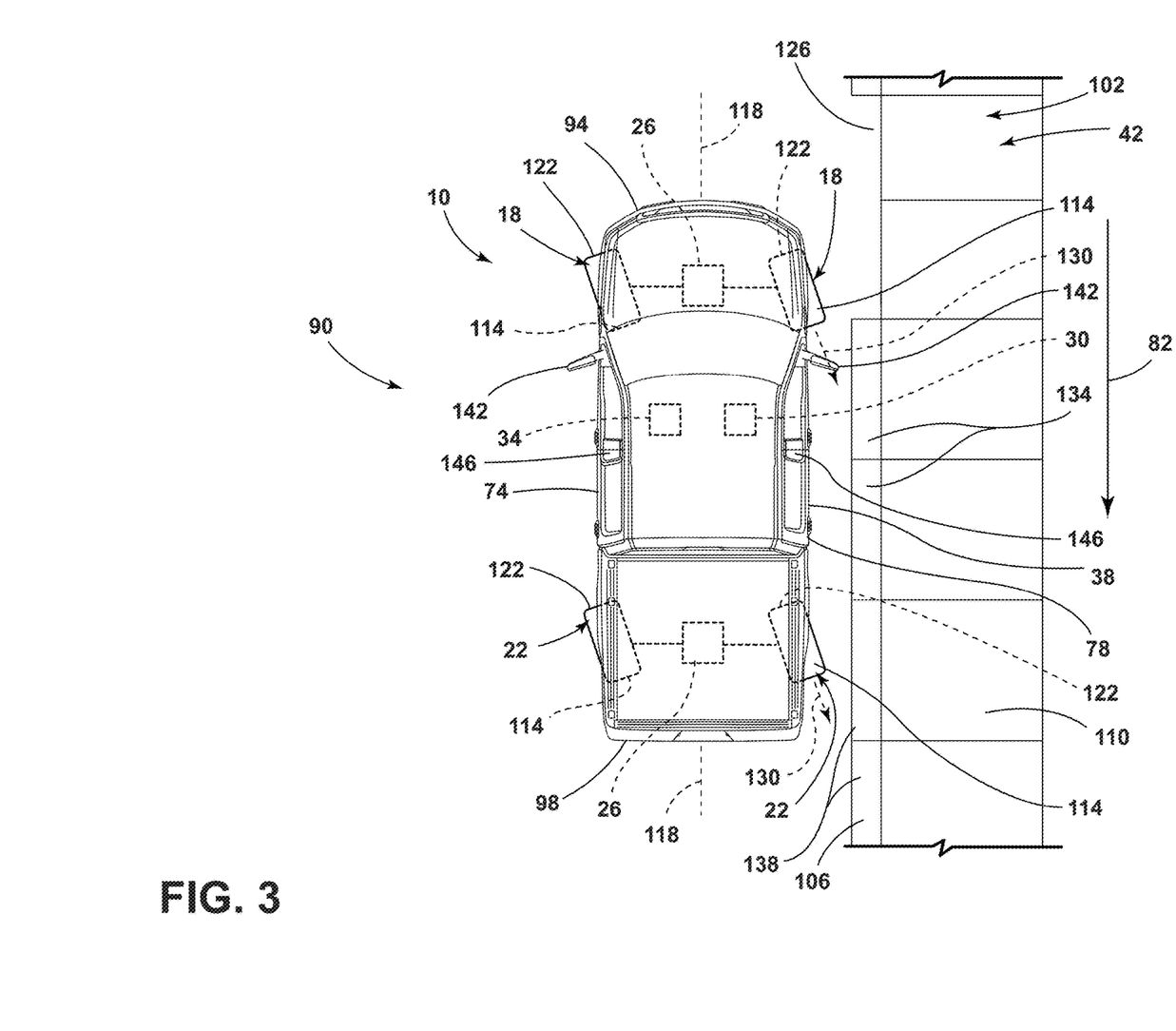
FIG. 3 is a top view of the vehicle, illustrating a parked condition adjacent to a road edge feature where a front of the vehicle is uphill of a rear of the vehicle, according to one example.

For purposes of description herein, the terms "upper," "lower," "right," "left," "rear," "front," "vertical," "horizontal," and derivatives thereof shall relate to the concepts as oriented in FIG. 3. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a parked vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, reference numeral 10 generally designates a vehicle. A system 14 for the vehicle 10 includes a front wheel 18, a rear wheel 22, a steering system 26, a sensing system 30, and a controller 34. The front wheel 18 and the rear wheel 22 are arranged on a first side 38 of the vehicle 10. The steering system 26 controls a directionality of the front wheel 18 and a directionality of the rear wheel 22. The sensing system 30 senses an exterior environment 42 adjacent to the first side 38 of the vehicle 10. For example, the sensing system 30 can be in communication with one or more exterior environment sensors 46. The sensing system 30 also senses a pitch of the vehicle 10. For example, the sensing system 30 can be in communication with a pitch sensor 54. The controller 34 controls the directionality of at least one wheel chosen from the front wheel 18 and the rear wheel 22 based on the sensed exterior environment 42, the sensed pitch of the vehicle 10, and the vehicle 10 being in a parked condition. In examples where the vehicle 10 is provided with a transmission, the parked condition of the vehicle 10 may be determined by referencing a gear sensor 58.

Figure 1:
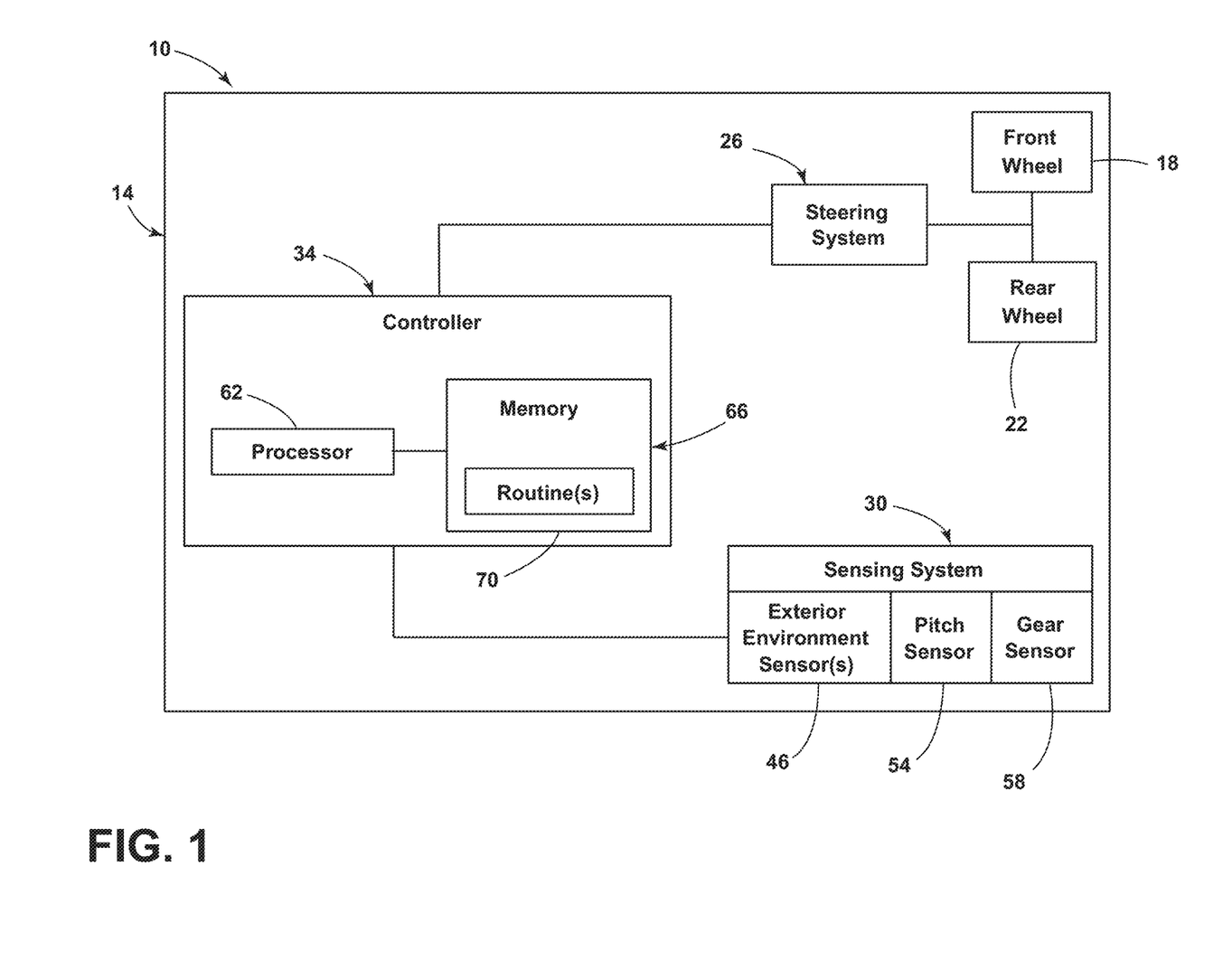
FIG. 1 is a schematic representation of a vehicle, illustrating various components thereof, according to one example.

With specific reference to FIG. 1, the vehicle 10 is shown as a schematic representation. The vehicle 10 includes the controller 34. The controller 34 may include a processor 62 and memory 66. The memory 66 stores one or more programmed software routines 70 that are executable by the processor 62. The software routines 70 can be utilized by the processor 62 to process signals and inputs from the vehicle 10 (e.g., a current directionality of the front wheel 18, a current directionality of the rear wheel 22, exterior environment characteristics, the pitch of the vehicle 10, the gear occupied by a transmission, and so on). The controller 34 may include analog and/or digital circuitry such as in the form of the processor 62, according to one example.

Figure 2:
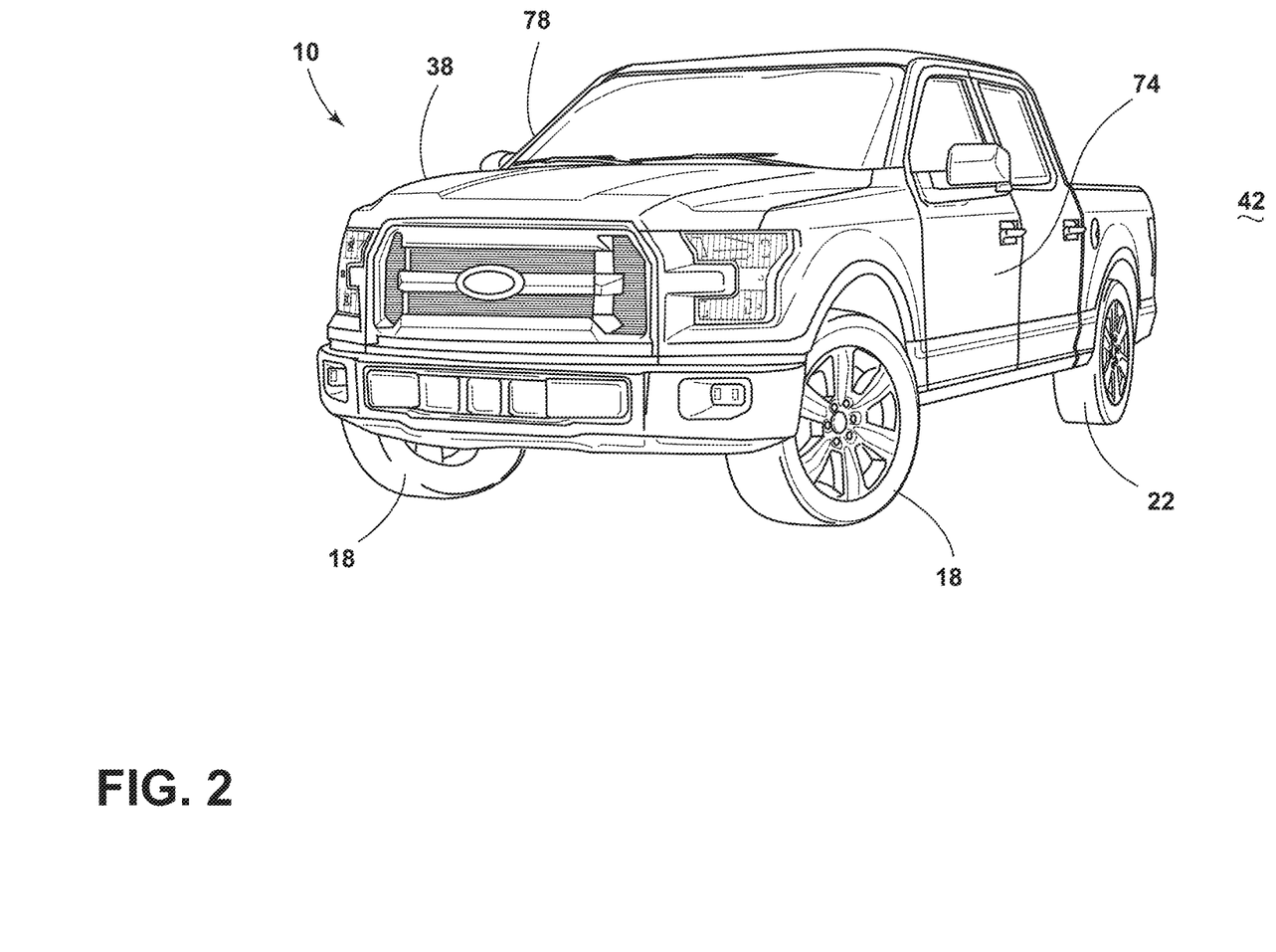
FIG. 2 is a front perspective view of the vehicle, according to one example.

Referring now to FIG. 2, the vehicle 10 may be a motor vehicle. For example, the vehicle 10 may be an automobile. While the vehicle 10 may be a motor vehicle, the present disclosure is not limited to internal combustion engines as a source of locomotive power for the vehicle 10. Rather, alternative sources may be utilized in providing locomotive power to the vehicle 10. For example, locomotive power may be provided to the vehicle 10 by electric motors, fuel cells, and/or petroleum-based fuel engines. According to various examples, the vehicle 10 may be driver-controlled, semi-autonomous, fully-autonomous, or any combination of user-controlled and automated. For example, the semi-autonomous example of the vehicle 10 may perform many or all-commuting functions (e.g., braking, turning, signaling, parking, etc.) independent of user interaction while the user maintains override control of the vehicle 10. The vehicle 10 may be provided with one or more of the front wheel 18. Similarly, the vehicle 10 may be provided with one or more of the rear wheel 22. For example, the vehicle 10 may be provided with one of the front wheels 18 and one of the rear wheels 22 on a driver side 74 of the vehicle 10. Similarly, the vehicle 10 may be provided with one of the front wheels 18 and one of the rear wheels 22 on a passenger side 78 of the vehicle 10. The first side 38 may be the driver side 74 in some instances. In other instances, the first side 38 may be the passenger side 78.

Referring to FIGS. 3-6, in various examples, the front wheel(s) 18 and the rear wheel(s) 22 are each steerable. For example, the vehicle 10 may be capable of four-wheel steering. The steering system 26 can include a front portion that is associated with the front wheel(s) 18 and a rear portion that is associated with the rear wheel(s) 22. In such an example, the front portion of the steering system 26 and the rear portion of the steering system 26 can be independently operable by the controller 34. The front wheel(s) 18 and the rear wheel(s) 22 are capable of being turned such that their directionality is aligned (e.g., parallel). The front wheel(s) 18 and the rear wheel(s) 22 are also capable of being turned such that their directionality opposes one another (e.g., see FIG. 6). The directionality of the front wheel(s) 18 and/or the rear wheel(s) 22 are controlled when the vehicle 10 is in a parked condition, or is about to enter a parked condition, while the vehicle 10 is located on an inclined plane (e.g., a hill, a slope, a ramp, etc.). Arrow 82 is provided in FIGS. 3-6 to indicate a downhill direction in the particular examples depicted. In general, the front wheel(s) 18 and/or the rear wheel(s) 22 may be positioned such that their directionality results in an increase in a distance 86 between the vehicle 10 and a roadway 90 in the event of downhill travel of the vehicle 10. In some examples, the directionality of the front wheel(s) 18 and/or the rear wheel(s) 22 may be positioned to increase a resistance to motion of the vehicle 10 in the downhill direction. For example, by positioning the front wheel(s) 18 and/or the rear wheel(s) 22 as angularly offset from the downhill direction, the resistance to motion of the vehicle 10 may be increased by providing a portion of a travel vector that is non-parallel to the downhill direction.

With specific reference to FIG. 3, the vehicle 10 is depicted with a front 94 of the vehicle 10 positioned uphill of a rear 98 of the vehicle 10, as indicated by arrow 82. Such positioning of the vehicle 10 is sensed by the pitch sensor 54 (e.g., tilt sensor, inclinometer, etc.) and provided to the controller 34. In the depicted example, the vehicle 10 is positioned between the roadway 90 and a road edge feature 102. In some examples, the road edge feature 102 may be a road edge fixture, such as an elevated structure that extends upwardly from a surface along which the roadway 90 extends. For example, the road edge fixture may include a curb 106, a log, or the like. In such examples, the road edge fixture may include a sidewalk 110. In various examples, the road edge feature 102 may be represented by a material change, such as a transition from pavement (e.g., concreate or asphalt) to gravel, dirt, and/or grass. In the depicted example, the vehicle 10 may be occupying a street-side parking space. The front wheel(s) 18 and/or the rear wheel(s) 22 may be angled toward the road edge feature 102 in a manner that directs the vehicle 10 toward the road edge feature 102 and/or away from the roadway 90 if the vehicle 10 were to travel downhill.

Referring again to FIG. 3, in the parked condition, the sensing system 30 monitors, or senses, the exterior environment 42 that is adjacent to the first side 38. For example, the sensing system 30 monitors, or senses, the exterior environment 42 that is immediately adjacent to the first side 38 (e.g., within about 0.5 meters, within about 1.0 meters, within about 1.5 meters, or within about 2.0). The sensing system 30 also monitors a degree of inclination, as well as a directionality of inclination, of the vehicle 10 by way of the pitch sensor 54. In the depicted example, the pitch of the vehicle 10 is such that the rear 98 of the vehicle 10 is positioned downhill of the front 94 of the vehicle 10. In such examples, the controller 34 may position a rearward portion 114 of at least one wheel chosen from the front wheel 18 and the rear wheel 22 further from a centerline 118 of the vehicle 10 than a forward portion 122 of the at least one wheel chosen from the front wheel 18 and the rear wheel 22. For example, the front wheel 18 and/or the rear wheel 22 positioned along the first side 38 (e.g., the passenger side 78) of the vehicle 10 can be positioned such that the directionality of the front wheel 18 and/or the rear wheel 22 places the rearward portion 114 further from the centerline 118 and nearer to the road edge feature 102 than the forward portion 122. Accordingly, the forward portion 122 can be positioned nearer to the centerline 118 and further from the road edge feature 102 in such examples. In the depicted example, the first side 38 is the passenger side 78 of the vehicle 10.

Referring further to FIG. 3, when the controller 34 determines that the sensed exterior environment 42 includes the road edge fixture (e.g., the curb 106) adjacent to one of the front wheel 18 and the rear wheel 22 (e.g., by way of the sensing system 30) and that the road edge fixture is absent from an area adjacent to the other of the front wheel 18 and the rear wheel 22, the controller 34 may control the directionality of the one of the front wheel 18 and the rear wheel 22 that is adjacent to the road edge fixture based on the sensed pitch of the vehicle 10. For example, when the pitch of the vehicle 10 is such that the rear 98 of the vehicle 10 is positioned downhill of the front 94 of the vehicle 10, the controller 34 may position the rearward portion 114 of the one of the front wheel 18 and the rear wheel 22 that is adjacent to the road edge fixture (e.g., the curb 106) further from the centerline 118 than the forward portion 122.

Referring still further to FIG. 3, in examples where the vehicle 10 is capable of steering the front wheel(s) 18 and the rear wheel(s) 22, the front wheel(s) 18 and the rear wheel(s) 22 can each be adjusted in their directionality by the controller 34 such that the directionality of the front wheel(s) 18 and the directionality of the rear wheel(s) 22 are aligned. For example, as depicted in FIG. 3, the front wheels 18 and the rear wheels 22 are each turned toward the driver side 74 of the vehicle 10. In the depicted example, at least a portion of the road edge fixture (e.g., the curb 106) is discontinuous. Said another way, a section of the road edge fixture is missing in the depicted example. The section of the road edge fixture that is missing can occur intentionally (e.g., as a matter of design, for water drainage locations, etc.) or unintentionally (e.g., due to wear and tear, deterioration, breakage, etc.). When the sensing system 30 and/or the controller 34 identify a discontinuity 126 in the road edge fixture and that the front wheel 18 or the rear wheel 22 is currently adjacent to the discontinuity 126, the controller 34 may control the steering system 26 such that the one of the wheels that is adjacent to the discontinuity 126 is positioned such that the rearward portion 114 and the forward portion 122 are arranged approximately equidistant from the centerline 118. In some examples, the front wheel 18 and the rear wheel 22 may be aligned in their directionality so long as the discontinuity 126 is not present adjacent to both the front wheel 18 and the rear wheel 22. Such examples may seek to maintain a more linear travel of the vehicle 10 as compared to a more rotational travel of the vehicle 10 (e.g., a turning motion). By maintaining a more linear travel of the vehicle 10, it may be possible to prevent the front 94 or the rear 98 of the vehicle 10 from decreasing a distance to the roadway 90.

Referring yet again to FIG. 3, when the sensing system 30 and/or the controller 34 identify discontinuity 126 in the road edge feature 102 and that a potential travel path 130 of the vehicle 10 may result in the front wheel 18 or the rear wheel 22 encountering the discontinuity 126 if the directionality of the front wheel 18 and the rear wheel 22 were to be aligned (e.g., all wheels turned toward the driver side 74), the controller 34 may control the steering system 26 such that the one of the wheels that may encounter the discontinuity 126 is positioned such that the rearward portion 114 and the forward portion 122 are approximately equidistant from the centerline 118. For example, if the discontinuity 126 were present at location(s) 134 or location(s) 138, the front wheel 18 or the rear wheel 22 on the first side 38, respectively, may be positioned such that the rearward portion 114 and the forward portion 122 were approximately equidistant from the centerline 118 (e.g., positioned as-if the vehicle 10 were to travel in a directly-forward direction or a directly-rearward direction). Accordingly, in such a situation for the depicted example, one of the wheels on the passenger side 78 would be positioned with the forward portion 122 positioned closer to the centerline 118 than the rearward portion 114, while the other wheel on the passenger side 78 would be positioned with the forward portion 122 and the rearward portion 114 approximately equidistant from the centerline 118.

Figure 4:
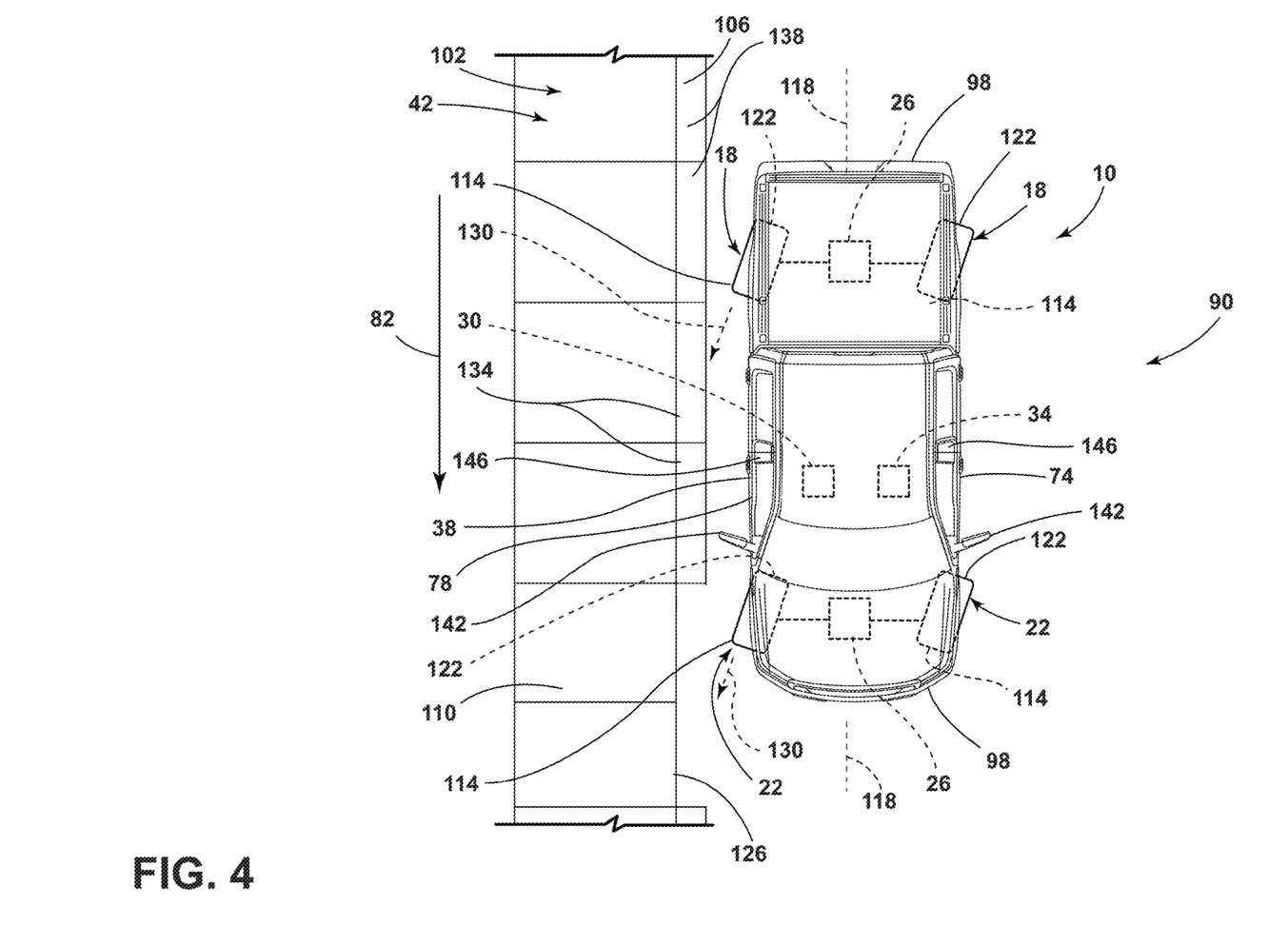
FIG. 4 is a top view of the vehicle, illustrating the parked condition adjacent to the road edge feature where the front of the vehicle is downhill of the rear of the vehicle, according to one example.

Referring now to FIG. 4, the vehicle 10 is depicted with the front 94 of the vehicle 10 positioned downhill of the rear 98 of the vehicle 10, as indicated by arrow 82. Such positioning of the vehicle 10 is sensed by the pitch sensor 54 (e.g., tilt sensor, inclinometer, etc.) and provided to the controller 34. When the vehicle 10 is so arranged and the road edge fixture is adjacent to one of the front wheel 18 and the rear wheel 22, the controller 34 may position the forward portion 122 of the one of the front wheel 18 and the rear wheel 22 that is adjacent to the road edge fixture further from the centerline 118 of the vehicle 10 than the forward portion 122. In the depicted example, the vehicle 10 is positioned between the roadway 90 and the road edge feature 102. In some examples, the road edge feature 102 may include the road edge fixture, such as the elevated structure that extends upwardly from the surface along which the roadway 90 extends. For example, the road edge fixture may include the curb 106, a log, or the like. In such examples, the road edge fixture may include the sidewalk 110. In various examples, the road edge feature 102 may be represented by a material change, such as a transition from pavement (e.g., concreate or asphalt) to gravel, dirt, and/or grass. In the depicted example, the vehicle 10 may be occupying a street-side parking space. The front wheel(s) 18 and/or the rear wheel(s) 22 may be angled toward the road edge feature 102 in a manner that directs the vehicle 10 toward the road edge feature 102 and/or away from the roadway 90 if the vehicle 10 were to travel downhill.

Referring again to FIG. 4, in the parked condition, the sensing system 30 monitors, or senses, the exterior environment 42 that is adjacent to the first side 38. For example, the sensing system 30 monitors, or senses, the exterior environment 42 that is immediately adjacent to the first side 38 (e.g., within about 0.5 meters, within about 1.0 meters, within about 1.5 meters, or within about 2.0). In the depicted example, the first side 38 is the passenger side 78 of the vehicle 10. The sensing system 30 also monitors a degree of inclination, as well as a directionality of inclination, of the vehicle 10 by way of the pitch sensor 54. In the depicted example, the pitch of the vehicle 10 is such that the front 94 of the vehicle 10 is positioned downhill of the rear 98 of the vehicle 10. In such examples, the controller 34 may position the forward portion 122 of at least one wheel chosen from the front wheel 18 and the rear wheel 22 further from the centerline 118 of the vehicle 10 than the rearward portion 114 of the at least one wheel chosen from the front wheel 18 and the rear wheel 22. For example, the front wheel 18 and/or the rear wheel 22 positioned along the first side 38 (e.g., the passenger side 78) of the vehicle 10 can be positioned such that the directionality of the front wheel 18 and/or the rear wheel 22 places the forward portion 122 further from the centerline 118 and nearer to the road edge feature 102 than the rearward portion 114. Accordingly, the rearward portion 114 can be positioned nearer to the centerline 118 and further from the road edge feature 102 in such examples.

Referring further to FIG. 4, in examples where the vehicle 10 is capable of steering the front wheel(s) 18 and the rear wheel(s) 22, the front wheel(s) 18 and the rear wheel(s) 22 can each be adjusted in their directionality by the controller 34 such that the directionality of the front wheel(s) 18 and the directionality of the rear wheel(s) 22 are aligned. For example, as depicted in FIG. 4, the front wheels 18 and the rear wheels 22 are each turned toward the passenger side 78 of the vehicle 10. In the depicted example, at least a portion of the road edge fixture (e.g., the curb 106) is discontinuous. Said another way, a section of the road edge fixture is missing in the depicted example. The section of the road edge fixture that is missing can occur intentionally (e.g., as a matter of design, for water drainage locations, etc.) or unintentionally (e.g., due to wear and tear, deterioration, breakage, etc.). When the sensing system 30 and/or the controller 34 identify the discontinuity 126 in the road edge fixture and that the front wheel 18 or the rear wheel 22 is currently adjacent to the discontinuity 126, the controller 34 may control the steering system 26 such that the one of the wheels that is adjacent to the discontinuity 126 is positioned such that the rearward portion 114 and the forward portion 122 are arranged approximately equidistant from the centerline 118. In some examples, the front wheel 18 and the rear wheel 22 may be aligned in their directionality so long as the discontinuity 126 is not present adjacent to both the front wheel 18 and the rear wheel 22. Such examples may seek to maintain a more linear travel of the vehicle 10 as compared to a more rotational travel of the vehicle 10 (e.g., a turning motion). By maintaining a more linear travel of the vehicle 10, it may be possible to prevent the front 94 or the rear 98 of the vehicle 10 from decreasing a distance to the roadway 90.

Referring still further to FIG. 4, when the sensing system 30 and/or the controller 34 identify the discontinuity 126 in the road edge feature 102 and that the potential travel path 130 of the vehicle 10 may result in the front wheel 18 or the rear wheel 22 encountering the discontinuity 126 if the directionality of the front wheel 18 and the rear wheel 22 were to be aligned (e.g., all wheels turned toward the passenger side 78), the controller 34 may control the steering system 26 such that the one of the wheels that may encounter the discontinuity 126 is positioned such that the rearward portion 114 and the forward portion 122 are approximately equidistant from the centerline 118. For example, as depicted in FIG. 4, the discontinuity 126 is positioned immediately adjacent to the front wheel 18 on the first side 38. Additionally, as depicting in FIG. 4, the discontinuity 126 is within the potential travel path 130. Accordingly, in such an example, the front wheel 18 on the first side 38 may be positioned such that the rearward portion 114 and the forward portion 122 are approximately equidistant from the centerline 118 (e.g., positioned as-if the vehicle 10 were to travel in a directly-forward direction or a directly-rearward direction). Accordingly, in the depicted example, the rear wheel 22 on the passenger side 78 may be positioned with the rearward portion 114 positioned closer to the centerline 118 than the forward portion 122, while the front wheel 18 on the passenger side 78 may be positioned with the forward portion 122 and the rearward portion 114 approximately equidistant from the centerline 118.

Figure 5:
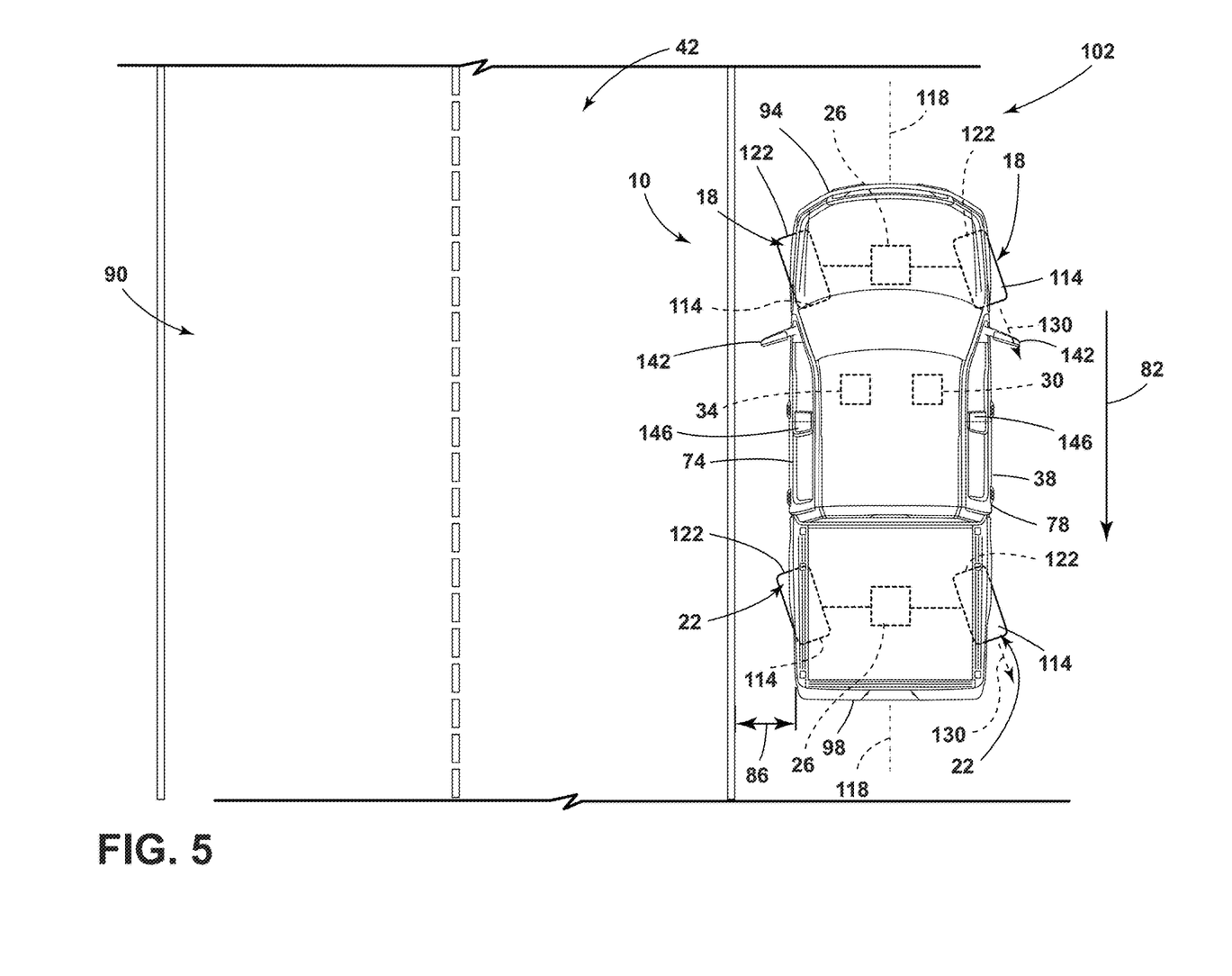
FIG. 5 is a top view of the vehicle, illustrating the parked condition adjacent to the road edge feature where the front of the vehicle is uphill of the rear of the vehicle, according to one example.

Referring to FIG. 5, the vehicle 10 is depicted with the front 94 of the vehicle 10 positioned uphill of the rear 98 of the vehicle 10, as indicated by arrow 82. Such positioning of the vehicle 10 is sensed by the pitch sensor 54 (e.g., tilt sensor, inclinometer, etc.) and provided to the controller 34. In the depicted example, the vehicle 10 is positioned between the roadway 90 and the road edge feature 102. In various examples, the road edge feature 102 may be represented by a material change, such as a transition from pavement (e.g., concreate or asphalt) to gravel, dirt, and/or grass. In the depicted example, the vehicle 10 may be occupying an area that is immediately adjacent to the roadway 90 (e.g., street-side parking, a shoulder of the roadway 90, etc.). The front wheel(s) 18 and/or the rear wheel(s) 22 may be angled toward the road edge feature 102 in a manner that directs the vehicle 10 toward the road edge feature 102 and/or away from the roadway 90 if the vehicle 10 were to travel downhill.

Referring again to FIG. 5, in the parked condition, the sensing system 30 monitors, or senses, the exterior environment 42 that is adjacent to the first side 38 in the manner described herein. In the depicted example, the pitch of the vehicle 10 is such that the rear 98 of the vehicle 10 is positioned downhill of the front 94 of the vehicle 10. In such examples, when the controller 34 determines that the sensed exterior environment 42 lacks the road edge fixture adjacent to the front wheel 18 and the rear wheel 22, the controller 34 may position both the rearward portion 114 of the front wheel 18 and the rearward portion 114 of the rear wheel 22 further from the centerline 118 of the vehicle 10 than the forward portion 122 of the front wheel 18 and the forward portion 122 of the rear wheel 22, respectively. For example, the front wheel 18 and/or the rear wheel 22 positioned along the first side 38 (e.g., the passenger side 78) of the vehicle 10 can be positioned such that the directionality of the front wheel 18 and/or the rear wheel 22 places the rearward portion 114 further from the centerline 118 and nearer to the road edge feature 102 than the forward portion 122. Accordingly, the forward portion 122 can be positioned nearer to the centerline 118 and further from the road edge feature 102 in such examples.

Referring further to FIG. 5, in examples where the vehicle 10 is capable of steering the front wheel(s) 18 and the rear wheel(s) 22, the front wheel(s) 18 and the rear wheel(s) 22 can each be adjusted in their directionality by the controller 34 such that the directionality of the front wheel(s) 18 and the directionality of the rear wheel(s) 22 are aligned. For example, as depicted in FIG. 5, the front wheels 18 and the rear wheels 22 are each turned toward the driver side 74 of the vehicle 10. In the event of downhill travel by the vehicle 10, such positioning of the front wheel(s) 18 and the rear wheel(s) 22 results in an increase in the distance 86 between the vehicle 10 and the roadway 90. Such examples may seek to maintain a more linear travel of the vehicle 10 as compared to a rotational travel of the vehicle 10 (e.g., a turning motion). By maintaining a more linear travel of the vehicle 10, it may be possible to prevent the front 94 or the rear 98 of the vehicle 10 from decreasing a distance to the roadway 90.

Figure 6:
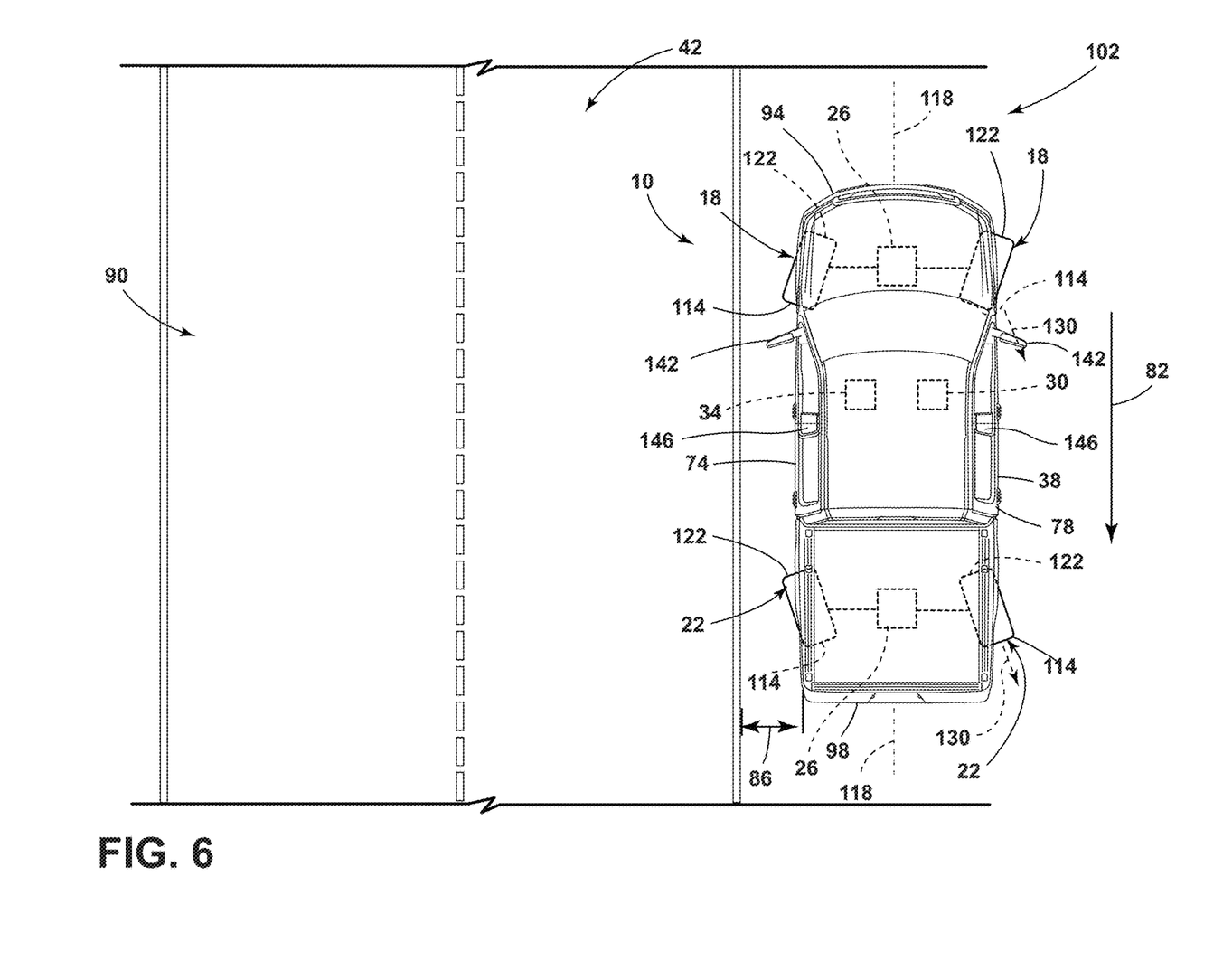
FIG. 6 is a top view of the vehicle, illustrating the parked condition adjacent to the road edge feature where the front of the vehicle is uphill of the rear of the vehicle, according to one example.

Referring now to FIG. 6, the vehicle 10 is depicted with the front 94 of the vehicle 10 positioned uphill of the rear 98 of the vehicle 10, as indicated by arrow 82. Such positioning of the vehicle 10 is sensed by the pitch sensor 54 (e.g., tilt sensor, inclinometer, etc.) and provided to the controller 34. In the depicted example, the vehicle 10 is positioned between the roadway 90 and the road edge feature 102. For example, the vehicle 10 may be occupying an area that is immediately adjacent to the roadway 90 (e.g., street-side parking, a shoulder of the roadway 90, etc.). In various examples, the road edge feature 102 may be represented by a material change, such as a transition from pavement (e.g., concreate or asphalt) to gravel, dirt, and/or grass. In the depicted example, the front wheel(s) 18 and the rear wheel(s) 22 are positioned such that their directionalities are not aligned. For example, the desired directionality of the front wheel(s) 18 may be opposite to the desired directionality of the rear wheel(s) 22.

Referring again to FIG. 6, when the controller 34 determines that the sensed exterior environment 42 lack a road edge fixture (e.g., the curb 106, a log, etc.) adjacent to the front wheel 18 and the rear wheel 22 on the first side 38, as well as the pitch of the vehicle 10 being such that the rear 98 of the vehicle 10 is positioned downhill of the front 94 of the vehicle 10, the controller 34 may control the directionality of the front wheel 18 such that the forward portion 122 is further from the centerline 118 than the rearward portion 114. Additionally, when the controller 34 determines that the sensed exterior environment 42 lack a road edge fixture (e.g., the curb 106, a log, etc.) adjacent to the front wheel 18 and the rear wheel 22 on the first side 38, as well as the pitch of the vehicle 10 being such that the rear 98 of the vehicle 10 is positioned downhill of the front 94 of the vehicle 10, the controller 34 may control the directionality of the rear wheel 22 such that the rearward portion 114 is further from the centerline 118 than the forward portion 122.

Referring further to FIG. 6, due to the opposing directionalities of the front wheel(s) 18 and the rear wheel(s) 22, the potential travel path 130 of the front wheel(s) 18 differs from the potential travel path 130 of the rear wheel(s) 22. More specifically, the desired directionality of the front wheel(s) 18 in the depicted example angles the front wheel(s) 18 toward the passenger side 78 of the vehicle 10, whereas the desired directionality of the rear wheel(s) 22 in the depicted example angles the rear wheel(s) 22 toward the driver side 74 of the vehicle 10. In such an arrangement, the vehicle 10 undergoes rotational motion (e.g., turning motion) in the event of downhill travel. Accordingly, the front 94 of the vehicle 10 may decrease the distance 86 to the roadway 90 while the rear 98 of the vehicle 10 may increase the distance 86 to the roadway 90. Therefore, the potential travel path 130 may describe a semi-circular (e.g., U-shaped) movement. In the event of continued motion of the vehicle 10 in such an arrangement, the vehicle 10 movement may be described as a damped pendulum or damped oscillation. By so arranging the front wheel(s) 18 and the rear wheel(s) 22 of the vehicle 10, continued downhill motion of the vehicle 10 may be prevented.

With reference to FIGS. 5 and 6, it is contemplated that the vehicle 10 may utilize a combination of the examples described herein in a given situation. For example, when the front 94 of the vehicle 10 is positioned uphill of the rear 98 of the vehicle 10, the controller 34 may initially position the front wheel(s) 18 and the rear wheel(s) 22 as oriented in FIG. 5. In such an example, once the vehicle 10 travels an initial distance downhill and/or away from the roadway 90, the controller 34 may then position the front wheel(s) 18 and the rear wheel(s) 22 as oriented in FIG. 6. Accordingly, the front 94 of the vehicle 10 may be prevented from decreasing the distance 86 between the vehicle 10 and the roadway 90 until additional space or clearance has been established therebetween, while also preventing continued downhill motion of the vehicle 10.

Referring to FIGS. 3-6, the sensing system 30 can include one or more imagers (e.g., camera(s)) that sense the exterior environment 42 adjacent to the first side 38 of the vehicle 10. In some examples, the imager(s) may be positioned in one or more side mirrors 142 of the vehicle 10, one or more B-pillars 146 of the vehicle 10, or any suitable location that is capable of providing a necessary viewing angle. In such examples, the controller 34 may process images obtained from the imager(s) to determine characteristics of the exterior environment 42. For example, the images from the imager(s) may be processed to determine what side of the vehicle 10 the roadway 90 is positioned on, which may in turn enable the controller 34 to determine the side of the vehicle 10 that serves as the first side 38 in a given situation. The images from the imager(s) may be processed to determine the characteristics of the road edge feature 102. For example, the images processed from the imager(s) may inform the controller 34 of the type (e.g., curb 106, log, etc.) and extent (e.g., continuous or discontinuous) of the road edge fixture when present. In some examples, the presence or absence of the road edge fixture may be determined by the controller 34 by way of data received by the controller 34 from the exterior environment sensor(s) 46. In various examples, the exterior environment sensor(s) 46 can include one or more proximity sensors (e.g., capacitive, optical, ultrasonic, etc.), one or more light detection and ranging (LIDAR) sensors, one or more radar sensors, one or more time-of-flight sensors, one or more near-infrared sensors, or any other suitable sensor capable of sensing such presence or absence.

Figure 7:
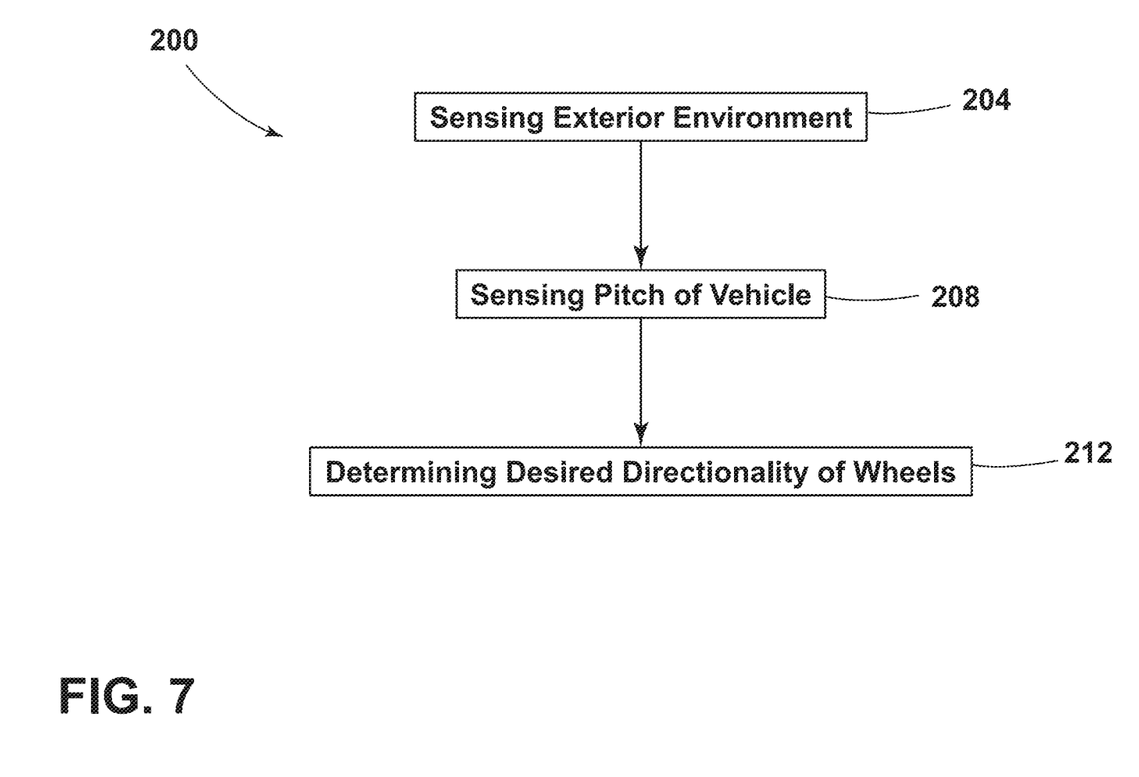
FIG. 7 is a flow diagram illustrating a method of operating a parked vehicle, according to one example.

Referring now to FIG. 7, a method 200 of operating a parked vehicle, such as the vehicle 10, includes the step 204 of sensing the exterior environment 42 that is adjacent to the first side 38 of the vehicle 10. For example, the step 204 of sensing the exterior environment 42 that is adjacent to the first side 38 of the vehicle 10 may sense the exterior environment 42 that is immediately adjacent to the first side 38. In some examples, the step 204 of sensing the exterior environment 42 that is adjacent to the first side 38 of the vehicle 10 can include identifying the road edge fixture as being adjacent to one of the front wheel 18 and the rear wheel 22 and identifying that the road edge fixture is absent from an area adjacent to the other of the front wheel 18 and the rear wheel 22. In such examples, the method 200 can also include a step of adjusting the one of the front wheel 18 and the rear wheel 22 that is adjacent to the road edge fixture such that the desired directionality for the given wheel is attained.

Referring again to FIG. 7, the method 200 also includes step 208 of sensing the pitch of the vehicle 10. The method 200 further includes step 212 of determining the desired directionality of the front wheel 18 and the desired directionality of the rear wheel 22 of the vehicle 10, where the front wheel 18 and the rear wheel 22 are each positioned along the first side 38. The desired directionality of the front wheel 18 and the desired directionality of the rear wheel 22 is based on the sensed exterior environment 42 adjacent to the first side 38 of the vehicle 10, as well as the sensed pitch of the vehicle 10. The method 200 can also include a step of adjusting at least one wheel chosen from the front wheel 18 and the rear wheel 22 to the desired directionality. Said another way, the method 200 can also include a step where the front wheel 18 and/or the rear wheel 22 are adjusted to the desired directionality for the given wheel.

Referring further to FIG. 7, in some examples, the desired directionality of the at least one wheel chosen from the front wheel 18 and the rear wheel 22 may place the forward portion 122 of the at least one wheel chosen from the front wheel 18 and the rear wheel 22 further from the centerline 118 of the vehicle 10 than the rearward portion 114 of the at least one wheel chosen from the front wheel 18 and the rear wheel 22 when the sensed pitch of the vehicle indicates that the front 94 of the vehicle 10 is downhill of the rear 98 of the vehicle 10. In various examples, the desired directionality of the at least one wheel chosen from the front wheel 18 and the rear wheel 22 may place the rearward portion 114 of the at least one wheel chosen from the front wheel 18 and the rear wheel 22 further from the centerline 118 of the vehicle 10 than the forward portion 122 of the at least one wheel chosen from the front wheel 18 and the rear wheel 22 when the sensed pitch of the vehicle 10 indicates that the rear 98 of the vehicle 10 is downhill of the front 94 of the vehicle 10.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A system for a vehicle, comprising:
   a front wheel;
   a rear wheel, wherein the front wheel and the rear wheel are arranged on a first side of the vehicle;
   a steering system that controls a directionality of the front wheel and a directionality of the rear wheel;
   a sensing system that:
   senses an exterior environment adjacent to the first side of the vehicle; and
   senses a pitch of the vehicle; and
   a controller that controls the directionality of at least one wheel chosen from the front wheel and the rear wheel based on the sensed exterior environment, the sensed pitch of the vehicle, and the vehicle being in a parked condition, wherein, in response to the sensed exterior environment including a road edge fixture adjacent to one of the front wheel and the rear wheel and that the road edge fixture is absent from an area adjacent to the other of the front wheel and the rear wheel, the controller is configured to adjust the directionality of the one of the front wheel and the rear wheel that is adjacent to the road edge fixture based on the sensed pitch of the vehicle.

2. The system for a vehicle of claim 1, wherein the controller is configured to position a rearward portion of the at least one wheel chosen from the front wheel and the rear wheel further from a centerline of the vehicle than a forward portion of the at least one wheel chosen from the front wheel and the rear wheel in response to the sensed pitch of the vehicle indicating that a rear of the vehicle is positioned downhill of a front of the vehicle.

3. The system for a vehicle of claim 2, wherein the front wheel and the rear wheel are each adjusted in their directionality by the controller such that the directionality of the front wheel and the directionality of the rear wheel are aligned.

4. The system for a vehicle of claim 1, wherein the controller is configured to position a forward portion of the at least one wheel chosen from the front wheel and the rear wheel further from a centerline of the vehicle than a rearward portion of the at least one wheel chosen from the front wheel and the rear wheel in response to the sensed pitch of the vehicle indicating that a front of the vehicle is positioned downhill of a rear of the vehicle.

5. The system for a vehicle of claim 4, wherein the front wheel and the rear wheel are each adjusted in their directionality by the controller such that the directionality of the front wheel and the directionality of the rear wheel are aligned.

6. The system for a vehicle of claim 1, wherein, in response to the sensed pitch of the vehicle indicating that a front of the vehicle is positioned downhill of a rear of the vehicle, the controller is configured to position a forward portion of the one of the front wheel and the rear wheel that is adjacent to the road edge fixture further from a centerline of the vehicle than a rearward portion of the one of the front wheel and the rear wheel that is adjacent to the road edge fixture.

7. The system for a vehicle of claim 1, wherein, in response to the sensed pitch of the vehicle indicating that a rear of the vehicle is positioned downhill of a front of the vehicle, the controller is configured to position a rearward portion of the one of the front wheel and the rear wheel that is adjacent to the road edge fixture further from a centerline of the vehicle than a forward portion of the one of the front wheel and the rear wheel that is adjacent to the road edge fixture.

8. The system for a vehicle of claim 1, wherein the road edge fixture is a curb.

9. The system for a vehicle of claim 1, wherein the controller is configured to adjust the directionality of the front wheel and the rear wheel such that a forward portion of the front wheel and a forward portion of the rear wheel are each further from a centerline of the vehicle than a rearward portion of the front wheel and a rearward portion of the rear wheel, respectively, in response to the sensed exterior environment lacking a road edge fixture adjacent to the front wheel and the rear wheel and the sensed pitch of the vehicle indicating that a front of the vehicle is positioned downhill of a rear of the vehicle.

10. The system for a vehicle of claim 1, wherein the controller is configured to adjust the directionality of the front wheel and the rear wheel such that a rearward portion of the front wheel and a rearward portion of the rear wheel are each further from a centerline of the vehicle than a forward portion of the front wheel and a forward portion of the rear wheel, respectively, in response to the sensed exterior environment lacking a road edge fixture adjacent to the front wheel and the rear wheel and the sensed pitch of the vehicle indicating that a rear of the vehicle is positioned downhill of a front of the vehicle.

11. The system for a vehicle of claim 1, wherein, in response to the sensed exterior environment lacking a road edge fixture adjacent to the front wheel and the rear wheel and the sensed pitch of the vehicle indicating that a rear of the vehicle is positioned downhill of a front of the vehicle, the controller is configured to:

adjust the directionality of the front wheel such that a forward portion of the front wheel is further from a centerline of the vehicle than a rearward portion of the front wheel; and adjust the directionality of the rear wheel such that a rearward portion of the rear wheel is further from the centerline of the vehicle than a forward portion of the rear wheel.

12. The system for a vehicle of claim 1, wherein the sensing system comprises an imager that senses the exterior environment adjacent to the first side of the vehicle.

13. The system for a vehicle of claim 1, wherein the sensing system comprises a pitch sensor that senses the pitch of the vehicle.

14. A method of operating a parked vehicle, comprising:
sensing an exterior environment adjacent to a first side of the vehicle, wherein the sensing of the exterior environment adjacent to the first side of the vehicle further comprises identifying a road edge fixture adjacent to one of the front wheel and the rear wheel and that the road edge fixture is absent from an area adjacent to the other of the front wheel and the rear wheel;
sensing a pitch of the vehicle; and
determining a desired directionality of a front wheel and a desired directionality of a rear wheel of the vehicle, wherein the front wheel and the rear wheel are each positioned along the first side, wherein the desired directionality of the front wheel and the desired directionality of the rear wheel is based on the sensed exterior environment adjacent to the first side of the vehicle and the sensed pitch of the vehicle.

15. The method of operating a parked vehicle of claim 14, further comprising:
adjusting at least one wheel chosen from the front wheel and the rear wheel to the desired directionality.

16. The method of operating a parked vehicle of claim 15, wherein the desired directionality of the at least one wheel chosen from the front wheel and the rear wheel places a forward portion of the at least one wheel chosen from the front wheel and the rear wheel further from a centerline of the vehicle than a rearward portion of the at least one wheel chosen from the front wheel and the rear wheel when the sensed pitch of the vehicle indicates that a front of the vehicle is downhill of a rear of the vehicle.

17. The method of operating a parked vehicle of claim 15, wherein the desired directionality of the at least one wheel chosen from the front wheel and the rear wheel places a rearward portion of the at least one wheel chosen from the front wheel and the rear wheel further from a centerline of the vehicle than a forward portion of the at least one wheel chosen from the front wheel and the rear wheel when the sensed pitch of the vehicle indicates that a rear of the vehicle is downhill of a front of the vehicle.

18. The method of operating a parked vehicle of claim 14, further comprising:
adjusting the one of the front wheel and the rear wheel that is adjacent to the road edge fixture such that the desired directionality is attained.

\* \* \* \* \*